July 7, 1959 A. SALOMONE 2,893,024
MACHINE FOR THE PRODUCTION OF BOOKS AND THE LIKE HAVING
CENTRALLY UNINTERRUPTED DOUBLE PAGES
Filed Oct. 2, 1957 3 Sheets-Sheet 1
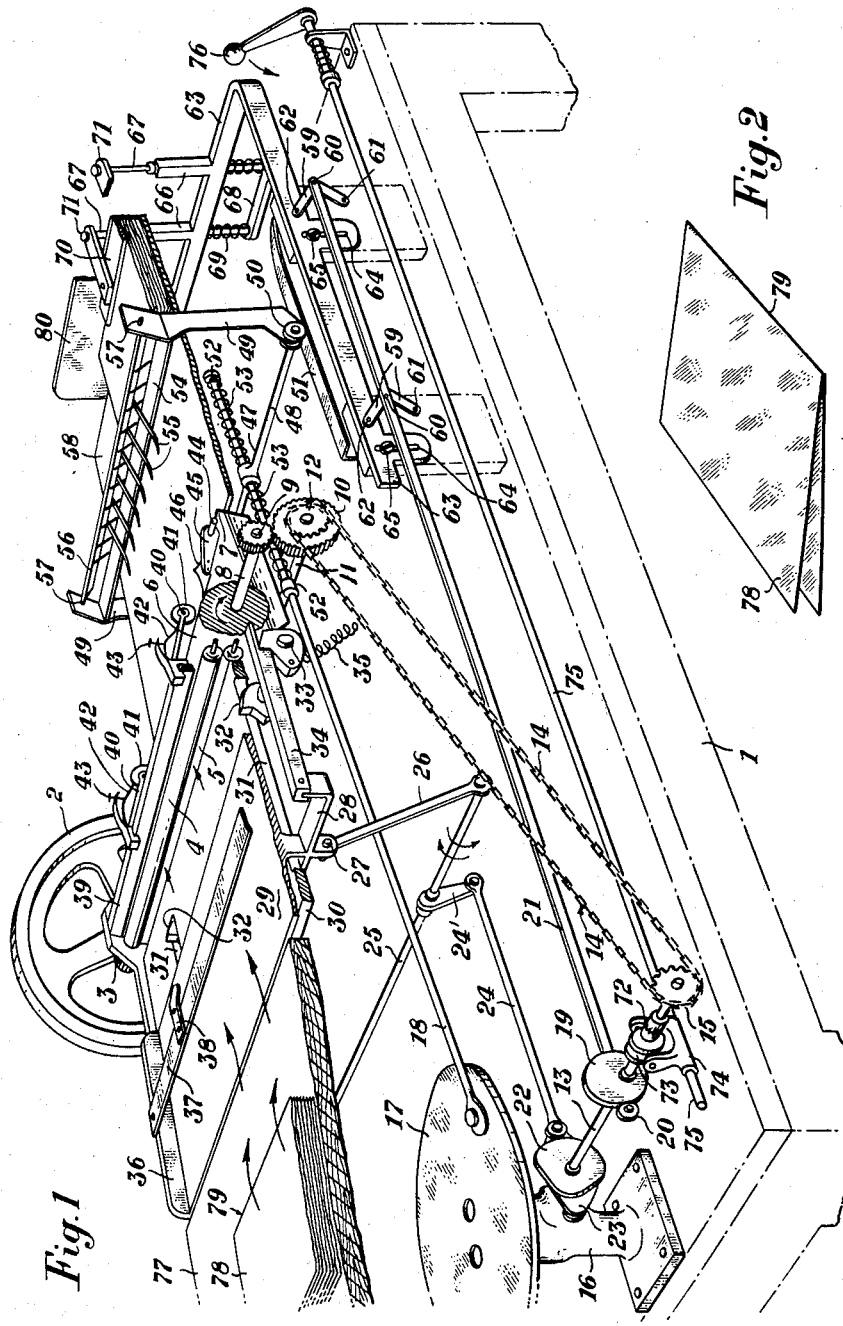
INVENTOR.
ALESSANDRO SALOMONE
BY
Wenderoth, Lind & Ponack
Attys.

July 7, 1959 A. SALOMONE 2,893,024
MACHINE FOR THE PRODUCTION OF BOOKS AND THE LIKE HAVING
CENTRALLY UNINTERRUPTED DOUBLE PAGES
Filed Oct. 2, 1957 3 Sheets-Sheet 2

*Fig. 3*

INVENTOR.
ALESSANDRO SALOMONE
BY
Wenderoth, Lind & Ponack
Attys.

July 7, 1959  A. SALOMONE  2,893,024
MACHINE FOR THE PRODUCTION OF BOOKS AND THE LIKE HAVING
CENTRALLY UNINTERRUPTED DOUBLE PAGES
Filed Oct. 2, 1957  3 Sheets-Sheet 3
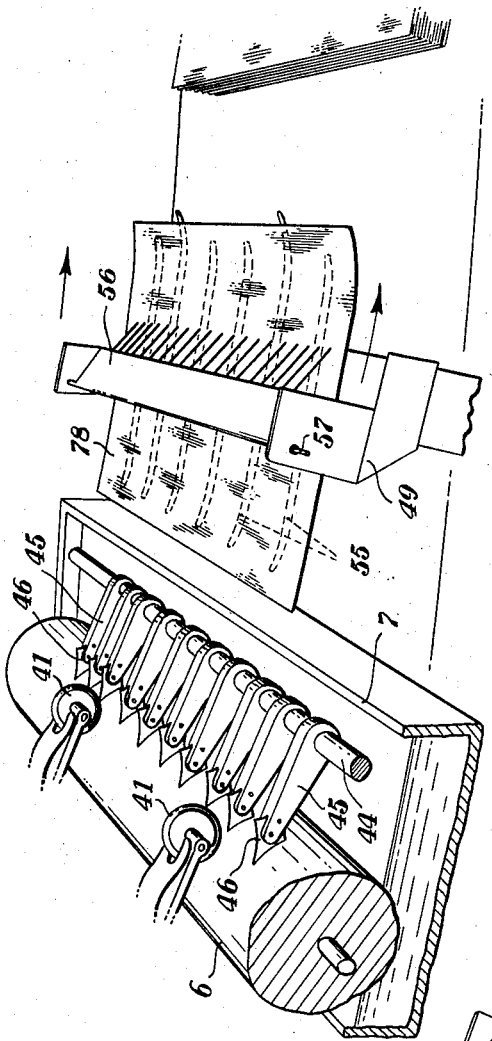
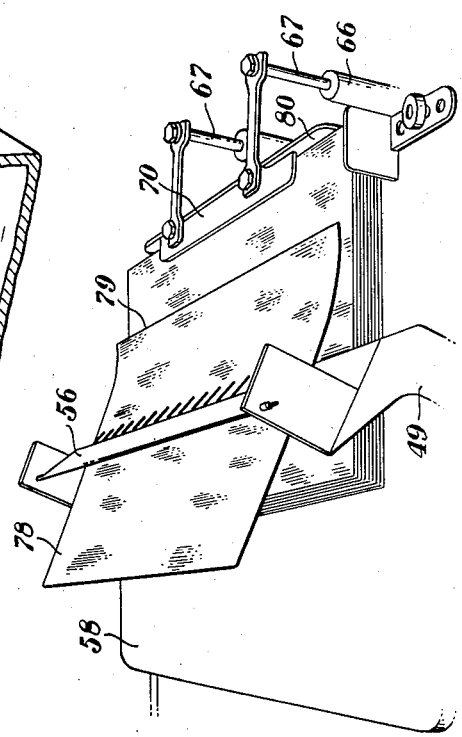
INVENTOR.
ALESSANDRO SALOMONE

United States Patent Office 2,893,024
Patented July 7, 1959

2,893,024

MACHINE FOR THE PRODUCTION OF BOOKS AND THE LIKE HAVING CENTRALLY UNINTERRUPTED DOUBLE PAGES

Alessandro Salomone, Rome, Italy

Application October 2, 1957, Serial No. 687,700

Claims priority, application Italy January 26, 1957

8 Claims. (Cl. 11—1)

The present invention relates to the production of books, particularly atlases, records and the like, having centrally uninterrupted double pages, obtained by sequentially gluing at least one of the outer surfaces of the leaves, previously folded, so as to obtain a volume the leaves of which are bound to one another throughout their entire areas.

The object of the present invention is to provide a machine by which the production of the above books can be obtained with an outstanding rapidity and exactness.

According to this invention, a machine is provided, comprising in combination a feeding and ranging unit for the folded leaves, a uniform gluing unit, means to pick up the leaves from the gluing unit and to arrange them in a perfect superposition, and means to press the superposed leaves in register with the zone adjacent the fold.

This invention will be hereinafter described with reference to the attached drawings, showing, only by way of example, one preferred embodiment of this invention.

In the drawings:

Fig. 1 diagrammatically shows a perspective view of the machine according to this invention, with some parts in cross-section;

Fig. 2 shows one of the folded leaves used for obtaining the books according to the process of the invention;

Figs. 3, 4, 5 sequentially show a partial view of the machine in three operative steps.

With reference to Fig. 1, the machine according to the present invention is supported by a partially depicted base framing, denoted at 1.

A motor, not shown in Figure 1, drives the pulley 2, mounted on the shaft 8, the movement of which drives, through the gears 3, the rollers 4, 5 and 6, in the direction shown by the arrows of the figure.

The roller 6 is partially immersed in a pan 7 containing an adhesive, and the shaft 8 of said roller is provided with a pinion 9 meshing with the gear 10 idly mounted on the shaft 11. The gear 10 is fixed to the pinion 12 driving the shaft 13 by the chain 14 and the pinion 15.

The shaft 13 is connected to the reduction gear 16, the output shaft of which drives the rotary disc 17, on which there is eccentrically articulated the connecting rod 18.

The eccentric 19 is mounted on the shaft 13, and a cam follower 20 rides on the periphery of said eccentric. The cam follower 20 is carried at one end of the rod 21. Also on the shaft 13 are fastened the eccentrics 22 and 23 acting on the connecting rod 24, so that the latter, upon rotation of the shaft 13, reciprocates causing the crank 24', fixed to the shaft 25, to rotate. The shaft 25 is provided at both ends with cranks 26, pivoted at points 27 on the stirrup 28, carried by the movable plate 29, which may slide on the shelf 30, the shelf 30 being provided with the holes 31, through which project the dogs 32 of eccentric members fixedly mounted on the shaft 33. The shaft 33 is freely journalled in its supports, while the stirrup 28 is provided with a stepped rod 34 acting on the projection of one of the eccentric members, so that when forwardly moved, said eccentric members are caused to rotate clockwise, while the return movement of said members is caused by means of the spring 35.

The movable plate 29 is provided with the side walls or borders 36 whereon is mounted the ranging fillet 37, exactly parallel to the projections 32 of the cams. The fillet 37 is slightly spaced above the plate 29, and is provided with the spring retainers 38, in the shape of fingers one end of each of which rests on the plate 29.

Close to the gluing roller 6 is arranged the cross member 39 carrying the fork shaped members 40, the fork shaped members carrying the wheels 41 which in turn roll on said roller being urged thereon by the springs 42, the force of which may be adjusted by the screws 43. In front of the roller 6 (see Fig. 4) is arranged a cross-wise mounted shaft 44 provided with a number of arms 45 carrying at their ends a corresponding number of thin contoured members 46 lightly contacting the gluing roller 6.

The connecting rod 18 is fitted near one of its ends into the hole 47 of the yoke 48 supporting the standards 49 and provided at its ends with the wheels 50 running on the guides 51. Equally spaced apart from the hole 47, on said connecting rod 18, are mounted two collars 52. Between the latter and the material surrounding the hole 47 are inserted two springs 53, the function of which is to transmit the motion of the connecting rod 18 to the yoke 48.

The standards 49 are connected by a cross-wise arranged rods 54 carrying a horizontal rake, comprised of the supports 55 arranged side-by-side and whereon an inclined light rake 56 rests, said rake being pivoted at 57 on the standards 49. The unit comprised of the standards 49, the rod 54 and the rake 56, form a carriage movable on the wheels 50, the stroke of which over plate 58 is determined by the stroke of the connecting rod 18.

The rod 21 is pivoted at 60 on two pairs of toggle levers 59, and said levers in turn, have one of their ends 61 pivoted on a stationary point of the framing of the machine, and the other end 62 pivoted on the frame 63, which is movable vertically causing the slot 64 to slide on the stationary pins 65.

The frame 63 is provided with the uprights 66 through which the stems 67 carried by the cross member 68 extend. Between the latter and the frame 63, two springs are wound about the lower portion of the stems 67, so that the latter are urged downwardly together with the fillet 70 fastened to the upper end 71 of said stems.

In order to disconnect the drive to the shaft 13 and all of the others members thereby actuated, a dog clutch 72 is provided and on the collar 73 of said clutch the fork-shaped member 74, carried by the rod 75, acts. A control lever 76 (or a pedal control, not shown) actuates said rod 75.

On the feeding plate 77 are arranged the folded leaves 78, one of which is shown in Fig. 2, with its fold 79 facing towards the rollers, and parallel thereto, while on the delivery plate are stacked the glued and superposed leaves, for forming the book.

The operation of the machine is as follows:

An operator at the feeding station 77 arranges the leaves, one at the time, under the spring fingers 38, so that the fold 79 of each leaf 78 is resting against the dogs 32 so as to arrange the fold 79 exactly parallel to the rollers.

When the movable plate 29 moves in the direction shown by the arrows of Fig. 1, the dogs 32 are withdrawn into the slots 31, and the leaf is grasped by the feeding rollers 4 and 5, and passed to the gluing roller 6, which applies to underside of the leaf a uniform layer of the adhesive contained within the sump 7.

While the leaf runs on the gluing roller, the wheels 41, carried by the fork shaped members 40 ensure a proper pressure of the leaf on the gluing roller. The members 40 may be moved on the cross-member 39 in order to adjust their spacing according to the width of the leaf. The latter, issuing from the roller 6, reaches the supports 55, carried by the movable carriage, travelling on the guides 51 and which at this operation stage, is at the end of its stroke towards the gluing roller 6 (Fig. 3).

As soon as the entire leaf lies on the supports 55 sliding under the rake 56 (Fig. 4), the movable carriage moves towards the delivery plate 58. The arrangement of the rake 56 serves to prevent the leaf from moving in a direction opposite to that of the movable carriage. The latter, when near to the end of its stroke (Fig. 5), due to the bend of the guides 51, is forwardly tilted and delivers the leaf onto the delivery plane 58, with the fold 79 of the leaf resting against the wall 80. As shown in Figure 3, some of the supports 55 carried by the movable carriage have a greater length than others; so that the leaf, when reaching the wall 80, is further pushed thereagainst by said longer supports the ends of which enter apertures of the wall 80.

At this step, due to lowering of the frame 63, the fillet 70 presses the zone adjacent the fold of the leaf against the corresponding zone of the underlying leaves, while a second operator, near to the delivery plate 58, completes the compression of the remainder of the leaf surface.

Thus a book having centrally uninterrupted double pages is obtained formed by a number of folded leaves glued in perfect superposition.

The present invention has been illustrated and described in one preferred form of embodiment, it being understood that constructional variations may be made therein without departing from the scope of the present invention.

I claim:

1. A machine for producing books with double pages which are uninterrupted at the center and formed by sheets folded by half and glued to each other along the outer face of the sheet, which machine comprises in combination a base framing, a shelf carried by said base framing, a movable plate mounted for reciprocating movement on the said shelf for carrying the folded sheet intended to form the book, a gluing roller carried by the said shelf and rotatable about its axis with respect to the said shelf, said gluing roller being arranged to receive one by one the said folded sheets for rolling glue onto the lower outer face thereof, two feeding rollers between said movable plate and said gluing roller for receiving the folded sheets therefrom and conveying them to the gluing roller, the said sheets having the folding at the side facing the gluing roller, a sump located underneath said gluing roller for holding glue and wherein the lower portion of the gluing roller is immersed, pressing means between the said feeding rollers and the said gluing roller for pressing the sheets against said gluing roller, a stationary terminal plate on the side of said gluing roller away from said movable plate for receiving the glue coated folded sheets coming from the gluing roller and for keeping said sheets in stacked position, removing means associated with said gluing roller for removing the said sheet from the said gluing roller, two guides fastened to the said base framing parallel to and laterally of the said gluing roller and the said terminal plate, said guides having a first portion of the upper surface thereof horizontal and a second portion toward the terminal plate inclined downwards, a carriage reciprocably movable on the said guides for movement toward and away from the gluing roller, said carriage having two vertical standards with wheels on the ends thereof rolling on the said guides, a transverse yoke connecting the two standards at the lower parts thereof and a grate member which connects the upper part of the said standards, said movable carriage being positioned to receive the glue coated sheets coming from the gluing roller and to lay them down on said terminal plate, a frame carried by the base framing and movable in a vertical plane, said movable frame having means thereon for pressing said folded sheets piled on the said terminal plate, driving means rotating said feeding rollers and said gluing roller, a shaft carried by the base framing and operatively connected to the shaft for the gluing roller from which it is driven, a reduction gear connected to the said driven shaft, a rotating disc carried by the base framing and rotatable in a horizontal plane by the said reduction gear, a plurality of eccentrics mounted on the said driven shaft, a first rod operatively connected to one of the eccentrics of the said plurality and connected to said movable frame for moving said movable frame in a vertical plane, articulated means operatively connected to a second eccentric of the said plurality of eccentrics to reciprocate said movable plate, and a connecting rod eccentrically articulated on the said rotating disc and connected to said movable carriage for moving said movable carriage on the said guides.

2. A machine as claimed in claim 1, wherein said movable plate has a ranging fillet thereon and spring retainers on said ranging fillet and the shelf has two apertures therein and extending perpendicular to the said fillet, said shelf having two eccentrics pivoted thereunder for protruding through the said apertures and for lowering into the said apertures during the forward stroke of said movable plate, said eccentrics each having a projection thereon against which a folded sheet abuts, which projections be on a line parallel to said ranging fillet.

3. A machine as claimed in claim 1 wherein said pressing means between said feeding rollers and said gluing roller comprise a cross bar parallel to said gluing roller and having at least two fork members thereon spring loaded downwardly and each having a wheel thereon rolling on the gluing roller for keeping a folded sheet against the gluing roller during the glue coating operation.

4. A machine as claimed in claim 1 wherein said removing means for removing a sheet from said gluing roller comprises a transverse shaft parallel to the gluing roller, said shaft having a plurality of upwardly inclined arms thereon, each of the said arms having a contoured head on the end thereof pressing lightly in contact with the gluing roller for removing therefrom the glue coated folded sheet.

5. A machine as claimed in claim 1, wherein said grate member comprises a plurality of supports arranged side by side, a portion of which supports have a length greater than the others, and a downwardly inclined rack on the side of said grate member facing said terminal plate, said rack being pivoted on the said standards above the said plurality of supports, said rack being arranged to rest on a glue coated sheet carried by the said grate member.

6. A machine as claimed in claim 1, wherein said movable frame comprises a rod bent at right angles to form two arms, the first arm being parallel to the axis of the gluing roller and the second arm being positioned laterally outwardly of and parallel to the guides for said movable carriage, two downwardly projecting projections on said second arm each having a slot therein, pins on said base framing engaging in said slots for permitting vertical movement of said frame, two pairs of toggled levers on said second arm of the movable frame connecting said second arm to the base framing, the levers in each pair being pivoted to each other at one end and having the other end pivoted on said second arm and said base framing respectively, said first rod being connected to the points at which said levers in each pair are pivoted to each other.

7. A machine as claimed in claim 6, wherein said first arm of the movable frame has two uprights on the upper part thereof, each of said two uprights having an axial bore therein, two stems passing through the said axial bores and protruding above the said uprights, a cross member connecting the lower ends of said stems, a spring mounted around each of said stems underneath the said first arm of the movable frame and urging said stems downward, the upper parts of the said stems protruding above the uprights and a horizontal fillet connecting the upper parts of said stems for pressing the glue coated sheets piled on the terminal plate.

8. A machine as claimed in claim 1, wherein said yoke connecting the lower parts of the said standards has a hole therein near one end for receiving the end of the said connecting rod eccentrically articulated to the said rotating disc, said end of the connecting rod protruding for a predetermined length from the said hole, two springs on the said connecting rod in the zones adjacent to the said hole, said springs being equal to each other in strength and abutting at one end against the said yoke, and collars fastened at the end of the connecting rod against which the other ends of said spring abut, said collars being equidistantly spaced from said yoke.

References Cited in the file of this patent

UNITED STATES PATENTS

| | | |
|---|---|---|
| 1,785,261 | Howard | Dec. 16, 1930 |
| 2,225,457 | Langsner | Dec. 17, 1940 |
| 2,232,131 | Palmer et al. | Feb. 18, 1941 |
| 2,699,749 | Halley | Jan. 18, 1955 |
| 2,782,756 | Hunt | Feb. 26, 1957 |